US 11,975,389 B2

(12) United States Patent
Panda et al.

(10) Patent No.: US 11,975,389 B2
(45) Date of Patent: May 7, 2024

(54) ADDITIVE MANUFACTURING OF COMPONENTS WITH FUNCTIONALLY GRADED PROPERTIES

(71) Applicant: HALLIBURTON ENERGY SERVICES, INC., Houston, TX (US)

(72) Inventors: Krutibas Panda, The Woodlands, TX (US); Larry Chambers, Kingwood, TX (US); Neelesh Deolalikar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 636 days.

(21) Appl. No.: 17/054,766

(22) PCT Filed: Nov. 14, 2019

(86) PCT No.: PCT/US2019/061521
§ 371 (c)(1),
(2) Date: Nov. 11, 2020

(87) PCT Pub. No.: WO2021/096517
PCT Pub. Date: May 20, 2021

(65) Prior Publication Data
US 2022/0297183 A1  Sep. 22, 2022

(51) Int. Cl.
*B22F 10/64* (2021.01)
*B22F 3/15* (2006.01)
(Continued)

(52) U.S. Cl.
CPC .......... *B22F 7/02* (2013.01); *B22F 3/15* (2013.01); *B22F 10/22* (2021.01); *B22F 10/64* (2021.01);
(Continued)

(58) Field of Classification Search
CPC ...................................................... B22F 10/64
See application file for complete search history.

(56) References Cited

U.S. PATENT DOCUMENTS 5,640,667 A * 6/1997 Freitag .................... B22F 10/28
419/38
2015/0283614 A1* 10/2015 Wu ........................... B22F 3/12
419/68
(Continued)

FOREIGN PATENT DOCUMENTS

EP           2551040 A1    1/2013
WO    WO-2018211432 A1   11/2018
WO    WO-2019113090 A1    6/2019

OTHER PUBLICATIONS

Stephen J. Mashl, Powder Metallurgy Processing by Hot Isostatic Pressing, Powder Metallurgy, vol. 7, ASM Handbook, Edited By P. Samal, J. Newkirk, ASM International, 2015, p. 260-270, https://doi.org/10.31399/asm.hb.v07.a0006042.*

(Continued)

*Primary Examiner* — Christopher S Kessler
(74) *Attorney, Agent, or Firm* — Conley Rose, P.C.; Rodney B. Carroll (57) ABSTRACT

Methods of manufacturing monolithic components with complex design features and functionally graded properties in any spatial direction may include forming of outer shell with an additive manufacturing process, loading the shell with bulk material and exposing the loaded shell to a hot isostatic pressing (HIP) process. The combination of the additive manufacturing process and the HIP process forms a diffusion bond between the outer shell and the bulk material resulting in a monolithic component with functionally graded properties. The outer shell may include an exterior
(Continued)

surface and an inner passage formed with relatively hard surfaces to accommodate fluids in a wellbore.

12 Claims, 6 Drawing Sheets

(51) Int. Cl.
    *B22F 7/02* (2006.01)
    *B22F 10/22* (2021.01)
    *B33Y 10/00* (2015.01)
    *B33Y 40/20* (2020.01)
    *B33Y 80/00* (2015.01)

(52) U.S. Cl.
    CPC .............. *B33Y 10/00* (2014.12); *B33Y 40/20* (2020.01); *B33Y 80/00* (2014.12)

(56) References Cited

U.S. PATENT DOCUMENTS

| | | |
|---|---|---|
| 2016/0243621 A1 | 8/2016 | Lucas et al. |
| 2016/0279708 A1* | 9/2016 | Hann ...................... B22F 3/105 |
| 2017/0095861 A1* | 4/2017 | Dykstra ................ B33Y 70/00 |
| 2017/0291221 A1* | 10/2017 | Swank .................. B33Y 10/00 |

OTHER PUBLICATIONS

Korean Intellectual Property Office, PCT/US2019/061521 International Search Report and Written Opinion, dated Jul. 31, 2020, 11 pages, Korea.
Quintus Technologies, Hot Isostatic Pressing Supporting the Additive Manufacturing Industry, HIP and Heat Treatment simultaneously, 2016, ISO-9001:2008, 4 Pages, www.quintustechnologies.com.

* cited by examiner

ADDITIVE MANUFACTURING OF COMPONENTS WITH FUNCTIONALLY GRADED PROPERTIES

CROSS-REFERENCE TO RELATED APPLICATIONS

This application is a U.S. national stage patent application of International Patent Application No. PCT/US2019/061521, filed on Nov. 14, 2019, the benefit of which is claimed and the disclosure of which is incorporated herein by reference in its entirety.

BACKGROUND

The present disclosure relates generally to components useful in the oil and gas industry, and methods for manufacturing these components. Example embodiments described herein include hybrid manufacturing techniques combining additive manufacturing and hot isostatic pressing processes to produce components with complex design features and properties that may be functionally graded in any given spatial direction.

Oil and gas components are being manufactured either via regular bulk manufacturing processes (subtractive), or with the advent of metal printing, components can be printed using additive manufacturing processes. Bulk manufacturing processes are mature and have reasonable cost but may operate at longer lead or cycle times and may only accommodate a finite design complexity. Complex design features (e.g. flat-bottom blind holes, lattice structures, grooves, channels, etc.) and functionally graded properties may be difficult to produce with subtractive processes. Additive manufacturing processes, such as 3D printing, typically have shorter cycle times, can accommodate design components with limitless complexity, and permit elements of the design process to be iterated to yield the best possible strength-structure optimization, e.g., in lattice designs.

Most downhole tool components require specific properties, e.g., hardness, chemical resistance, etc., near the surface region since they come in contact with a geologic formation or drilling mud, but the remainder of the component may be only be required to provide adequate structural support properties. However, producing components with functionally graded properties to accommodate these requirements can be a challenge for both additive and subtractive processes.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure describes methods to manufacture monolithic components with complex design features and functionally graded properties in any spatial direction. The manufacturing of monolithic components may include forming a capsule or outer shell comprising of first and second segments, each of which may be created via an additive manufacturing process. Next the outer shell is loaded with hulk material to form an inner segment and together, the outer shell and the bulk material are exposed to an elevated temperature and gas pressure, thereby binding the bulk material and outer shell to form the monolithic component. The first segment of the outer shell may define an exterior surface of the monolithic component and may be printed with a first material having a chemical resistance to an environment in which the component may operate. The second segment of the outer shell may define an interior flow path of the monolithic component and may be printed with a second material providing erosion resistant properties to accommodate an abrasive fluid flowing through the flow path. The outer shell may be loaded between the first and the second segments with a bulk material selected to provide high strength to the component. Once the entire loaded structure is subjected to elevated temperature and gas-pressure in an isostatic and sinter hipping process, a near-net shape of the monolithic component may be defined. The geometry of the monolithic component may be finalized by machining or other finishing processes.

Figure 1:
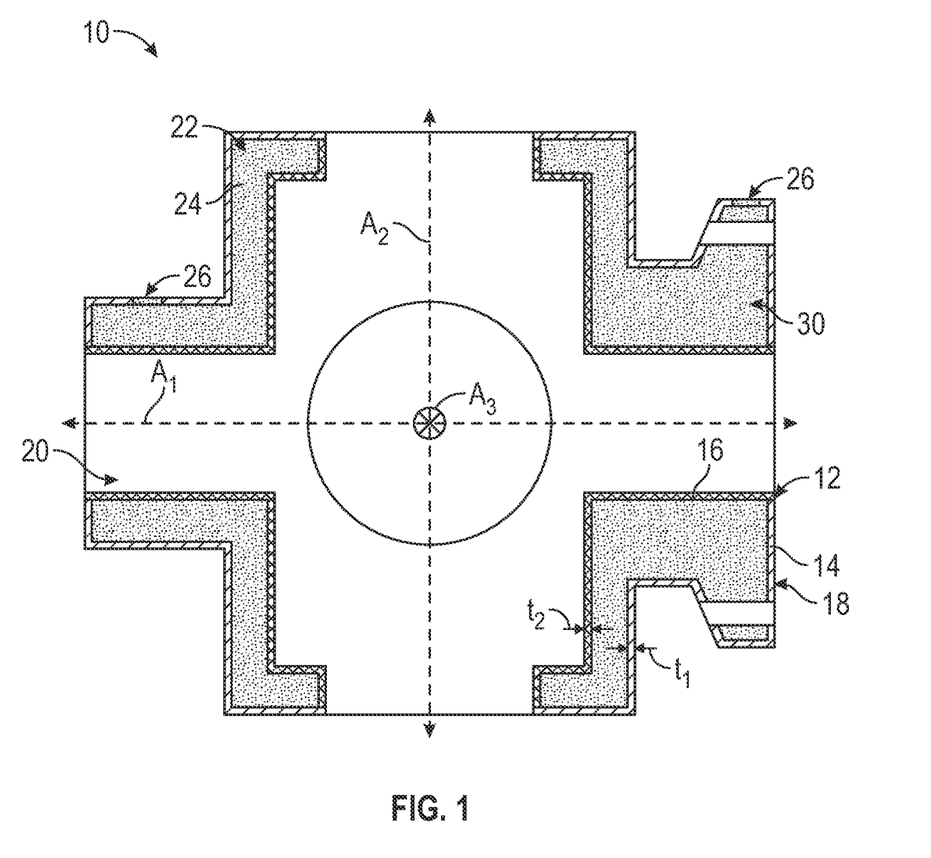
FIG. 1 is a cross-sectional view of a functionally graded component which may be manufactured by a combination of additive manufacturing and hot isostatic pressing in accordance with principles of the present disclosure.

FIG. 1 is a cross sectional view of a functionally graded, monolithic component 10, which may be manufactured with processes according to the present disclosure. The component 10 includes an outer shell 12 or capsule constructed of a first segment 14 and a second segment 16. The first segment 14 generally defines an exterior surface 18 of the monolithic component 10 and may be constructed of a material specifically selected to accommodate an exterior environment of the monolithic component in use. For example, the first segment 14 may be constructed of a corrosion resistant material such as 316 stainless steel (316 SS) including about 2-3% molybdenum alloyed therein. The second segment 16 defines an interior flow path 20 through the monolithic component 10. As illustrated, the interior flow path 20 extends through the monolithic component along three orthogonal axes $A_1$, $A_2$ and $A_3$, and in other embodiments, may define any complex geometry. The second segment 16 may be constructed from a material specifically selected to sustain fluid flow through the flow path 20. For example, the second segment 16 may be constructed of a material that resists wear, such as solid tungsten carbide, solid ceramic, or solid Stellite™, which is a cobalt based alloy. In some embodiments, the first and second segments 14, 16 may be constructed of similar or distinct materials, and may exhibit similar or dissimilar thicknesses $t_1$, $t_2$ to accommodate any particular purpose.

An internal cavity 22 is defined between the first and second segments 14, 16 in which a bulk material 24 is disposed. The bulk material 24 may include metal-based, polymer-based, ceramic-based, composite-based materials or combination thereof. Fill ports 26 may be provided in the first segment 14 of the outer shell 12 to permit loading of the bulk material 24 into the internal cavity 22 in a molten state or in powder form. The bulk material 24 may be selected to provide structural support to the monolithic component 10, but since the bulk material is contained within in the internal cavity 22, the bulk material may or may not provide the features, e.g., hardness, corrosion resistance, etc. of the materials of the outer shell 12. The bulk material 24 may constitute a majority of the volume or weight of the monolithic component 10 and defines a third segment 30 of the monolithic component.

The monolithic component 10 may be described as functionally graded since the material properties of the monolithic component 10 vary along any spatial direction, e.g., the directions defined by the axes $A_1$, $A_2$ and $A_3$. The materials selected for the segments 14, 16, 30 permit the three different segments 14, 16, 30 to perform distinct functions of the monolithic component 10. As described in greater detail below, the monolithic component 10 may be constructed by first forming the outer shell 12 by an additive manufacturing process, and then binding the bulk material 24 to the outer shell 12 in a hot isostatic pressing manufacturing process to form a near net shape of the monolithic component 10. To complete the monolithic component 10, auxiliary, manufacturing processes may be conducted. For example, mounting bores 32 or other features may be produced by an auxiliary machining process.

Figure 2:
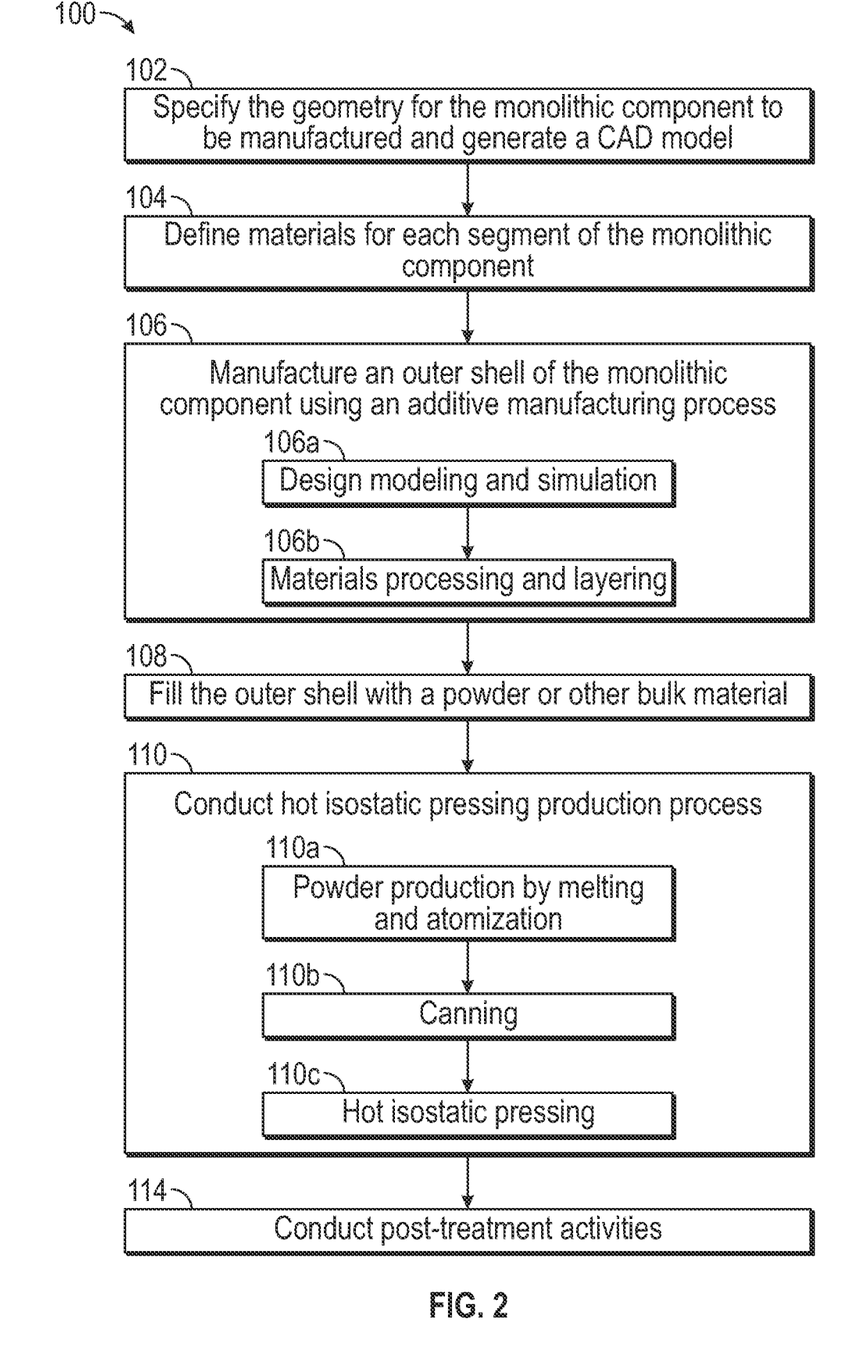
FIG. 2 is a view of a flow diagram illustrating a method including a combination of additive manufacturing and hot isostatic pressing manufacturing processes, which may be employed to manufacture functionally graded components such as the component of FIG. 1.

Referring now to FIG. 2, and with reference to FIGS. 3A through 3D, a method 100 for manufacturing the monolithic component 10, or similar components is described. Initially, at step 102, the method 100 includes specifying the desired geometry of the monolithic component 10 to be manufactured. In some embodiments, a Computer Aided Design (CAD) model 120 (FIG. 3A) for the desired component geometry may be generated. For example, various 2D and 3D modeling software packages can be utilized for generating the model 120 such as AutoCAD, ANSYS, COMSOL, Solid WORKS, CATIA and the like. A user may enter data into the modeling software including volume, size, model shape, and model dimensions such as width, height, thickness. Boundaries of the various segments 14, 16, 30 and may be identified and any other suitable values may be specified. At step 104, the method 100 includes defining a material or combination of materials for each segment 14, 16, 30 of the geometry to be manufactured. The materials selected may include metal-based, polymer-based, ceramic-based, composite-based materials or combination thereof.

Figure 3A:
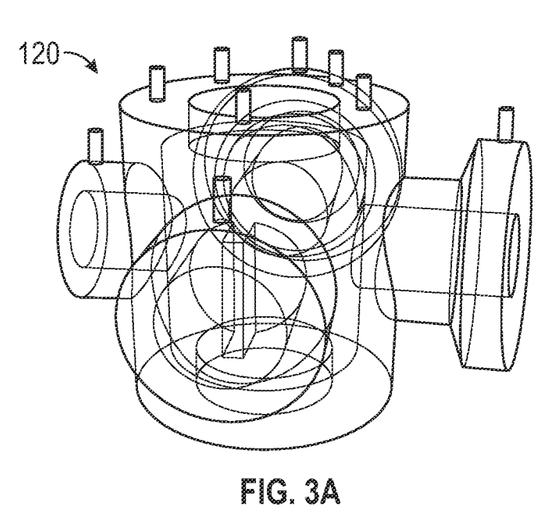
FIGS. 3A through 3D are perspective views illustrating the functionally graded component of FIG. 1 in sequential stages of manufacture including a CAD model of the component (FIG. 3A), a capsule or outer shell of the component created using the additive manufacturing process of FIG. 2 (FIG. 3B), the outer shell having an interior chamber thereof filled with powder (FIG. 3C), and the powder filled outer shell subject to the hot isostatic pressing process of FIG. 2 (FIG. 3D)
Figure 3B:
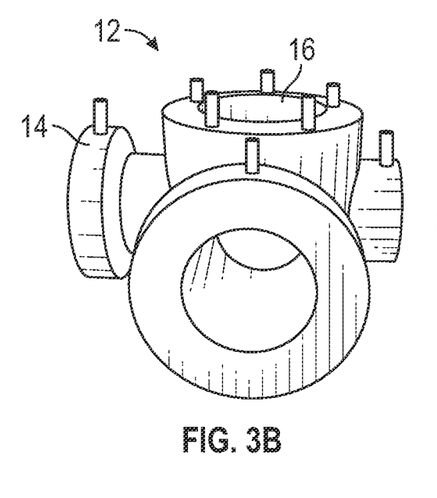

At step 106, the method 100 includes manufacturing the outer shell 12 of the monolithic component 10 using additive manufacturing process. The additive manufacturing process may include a modeling and simulation (step 106a) where the CAD model 120 (FIG. 3A) is converted to a stereolithography file format native to some 3D modeling systems. The portions of the CAD model 120 forming the outer shell 12 may be oriented and sliced based on build time, cost, powder size and layer thickness to determine a schedule for the build. Once all the parameters are defined and materials are selected, the user sets a 3-D printer to the deposit the selected material to be processed and printed (step 106) to form the outer shell 12 (FIG. 3B). The first and second segments 14, 16 with their unique geometry and selected materials is thereby manufactured. The additive manufacturing process of step 106 may be repeated to generate as many outer shells 12 as necessary to create a desired number of monolithic components.

Figure 3C:
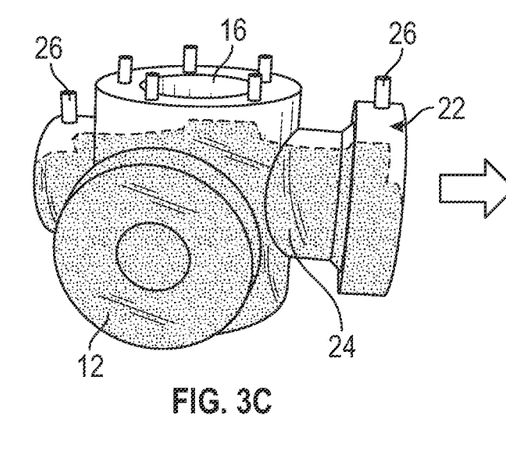
Figure 3D:
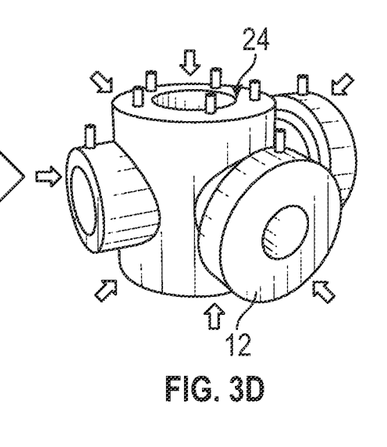

At step 108, the method 100 includes loading the outer shell 12 with bulk material 24 (see FIG. 3C). As indicated above, the bulk material 24 may include one or more of metal-based, polymer-based, ceramic-based, composite-based materials or combination thereof. Loading of the bulk material 24 includes installing the bulk material 24 in a molten state or in powder form through fill ports 26 into the interior cavity 22 (FIG. 1) defined between the various segments 14, 16 of the outer shell 12. Loading the bulk material 24 combines all the parts of the monolithic component 10 and creates a single composite geometry including the first and second segments 14, 16 of the outer shell 12 with the one or more bulk materials 24 of the inner segment 30, In some embodiments, loading the outer shell 12 includes varying a composition of the bulk material 24 as the bulk material 24 is loaded through the fill ports 26, to thereby functionally grade the monolithic component 10 in a vertical spatial direction.

At step 110 of method 100, a hot isostatic pressing process is performed to pressure seal and treat the composite geometry at an elevated temperature to thereby form a near net shape of the final version of the monolithic component 10. The hot isostatic pressing (RIP) process bonds the bulk material 24 to the outer shell 12 formed by additive manufacturing and improves the material properties of both the outer shell 12 and the bulk material 24. The hot isostatic pressing (HIP) may be conducted in a furnace operating at pressure in the range of about 400 to about 2,070 bar (about 5,800 to about 30,000 psi) and temperatures up to about 2,000° C. (about 3,632° F.). A HIP process can achieve 100% of maximum theoretical density of a material and improve the ductility and fatigue resistance of the material for critical, high-performance applications. The first and second segments 14, 16 formed from a 3D-printing, regardless of the printing method (electron beam melting (EBM), selective laser melting (SLM), etc.), benefits greatly from HIPing process. Some of the advantages of the HIP process are approximately 100% of theoretical density, longer life time, predictive life time, lighter and/or low weight designs, improved material properties, increased mechanical properties by reducing fatigue, wear, abrasion and ductility, reduced property scatter, and stress relief of printed parts. The HIP process allows for more efficient production then conventional manufacturing processes. When HIP is combined with additive manufacturing processes it reduces energy use by 50% and material cost up to 90%. At step 112 of method 100 the combined model will be exposed to hipping process. At the start of the hipping process the temperature and pressure are elevating until the temperature reaches a specific point called "dip in temperature" at a very high pressure that allows for creation of a massive amount of nucleation points at the nano-scale (step 110a). Next canning or preserving of the component is conducted (step 110b). During step 110b temperature and pressure are decreased, and cooling of the component is permitted over a specified time period. At step 110c hot isostatic pressing is conducted where temperature may be held generally constant, and pressure is significantly increased. The treated component may then be cooled to define a near-net shape of the monolithic component 10. The near-net shape produced by the initial additive manufacturing process (step 106) and the HIP process (step 110) substantially approximates the final shape of the monolithic component 10, reducing the need for surface finishing. These processes 106, 110 may generate near net shapes for which post treatment is not necessary.

Optional step 112 of method 100 includes conducting any post treatment activities such as grinding, finishing, polishing, spraying and combinations thereof. In some embodiments, post treatment activities may include machining processes, e.g., to form mounting bores 32 (FIG. 1), removing any excess material required for sealing fill ports 26 (FIG. 3C), etc.

A significant advantage to the method 100 described above is the ability to produce monolithic components 10 with functionally graded properties in any spatial direction. The combination of additive manufacturing with a HIP process may produce monolithic structures 10 with an optimized strength to structure ratio. An optimized strength to structure ratio relates to the strength a material with respect to the density, and may also be known as a strength-to-weight ratio or a strength-to-mass ratio. The HIP process allows for increased part density by pore elimination. The HIP process may also improve bonding between the materials forming individual segments 14, 16, 30, and therefore, the final monolithic component 10 may have optimized strength to structure properties. The example hybrid manufacturing process 100 may be employed to produce a variety of components with varying geometry and material properties, and may overcome many challenges associated with traditional manufacturing processes.

For example, functional grading of properties is challenging by employing only additive manufacturing processes. Components in downhole and/or drilling tools may require resistance to wear (abrasion/erosion), resistance to corrosion (general corrosion, localized corrosion, galvanic corrosion etc.) as a result of coming in contact with geologic formations, drilling mud etc. These functional requirements may be satisfied by only a portion of the tools existing near an interior and/or exterior surface region of the tools. For example, a casing or lining hanger may require erosion resistance only at flow-ports defined thereon. Thus, a material providing enhanced erosion properties may be selected and printed at a thickness of approximately 0.100 inches around the flow ports, and the remaining portions of the hanger may be formed with a bulk material that may be lighter, may exhibit desired magnetic or non-magnetic properties, may be less expensive, etc., while adequate structural properties.

Current manufacturing routes (additive/subtractive) do not address this sort of complex functional grading in the manner of the method 100 described above, which may be employed to create any complex functional grading of properties in components, wherein additive manufacturing builds the 0.100 inches (or any thickness that the design dictates) outer shell 12. This shell 12 may then be filled with bulk material 24, e.g., in powdered form, which may be selected depending upon non-magnetic properties, structural properties of the material. The outer shell 12 filled with bulk material 24 is then pressure sealed, and furnace hipped (step 110) to advantageously create a single monolithic component 10 with the outer-shell 12 providing specific functional surface properties, e.g., erosion resistance, an and inner segment 30 providing structural support to the monolithic component 10.

Figure 4:
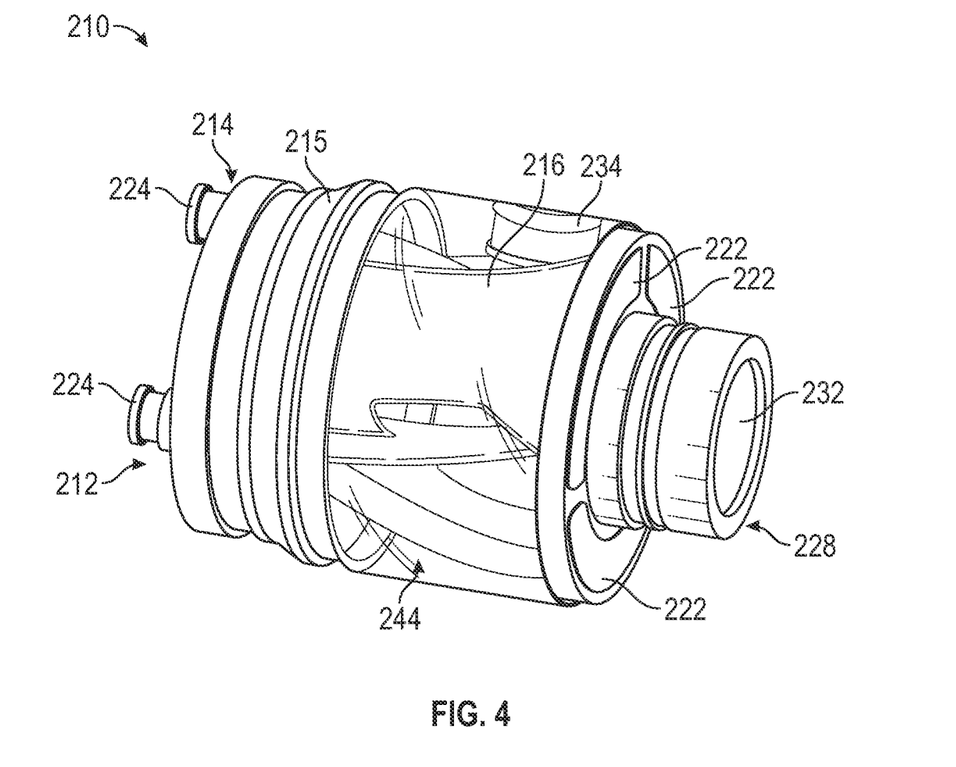
FIG. 4 is a perspective view of another example of a monolithic component with functionally graded properties, which may be created using hybrid manufacturing techniques embodying principles of the present disclosure.

FIG. 4 is a perspective view of another example of a monolithic component 210 with functionally graded properties, which may be created using techniques embodying principles of the present disclosure. An outer shell 212 may be formed with dissimilar materials. A first segment 214 of the outer shell 212 may be printed from a first material, e.g. a carbide material, and may include circumferential grooves 215 or notches defined therein to facilitate coupling the monolithic component 210 with adjacent components in operation. A second segment 216 of the outer shell 212 may be printed from a second material, e.g., an erosion resistant material such as Stellite™, and may define a plurality of independent or interdependent interior flow paths between ports 222, and 224. The use of an additive manufacturing process to create the second segment facilitates the creation of a complex geometry that may be required for transitioning fluid flow between the ports 222, 224. The material selection may provide the desired erosion resistance or other functional properties to accommodate the flow of an abrasive fluid therethrough. A third segment 228 of the outer shell 212 be printed with a third distinct material or with the first material. A flow path between ports 232 and 234 may be defined by the third segment 228. Since a fluid expected to flow between the ports 232, 234 may be distinct from a fluid expected to flow between ports 222 and 224, the second and third segments of the outer shell may be constructed of from dissimilar materials to accommodate dissimilar functional requirements. A bulk material (not shown for clarity) may be filled into a cavity 244 defined between the first, second and third segments 214, 216, 228 of the outer shell 212 to provide structural support to the monolithic component 210. The bulk material may include stainless steel, which can be diffusion bonded to the outer shell 212 in order for the final monolithic component 210 with functionally graded properties to be formed.

Figure 5:
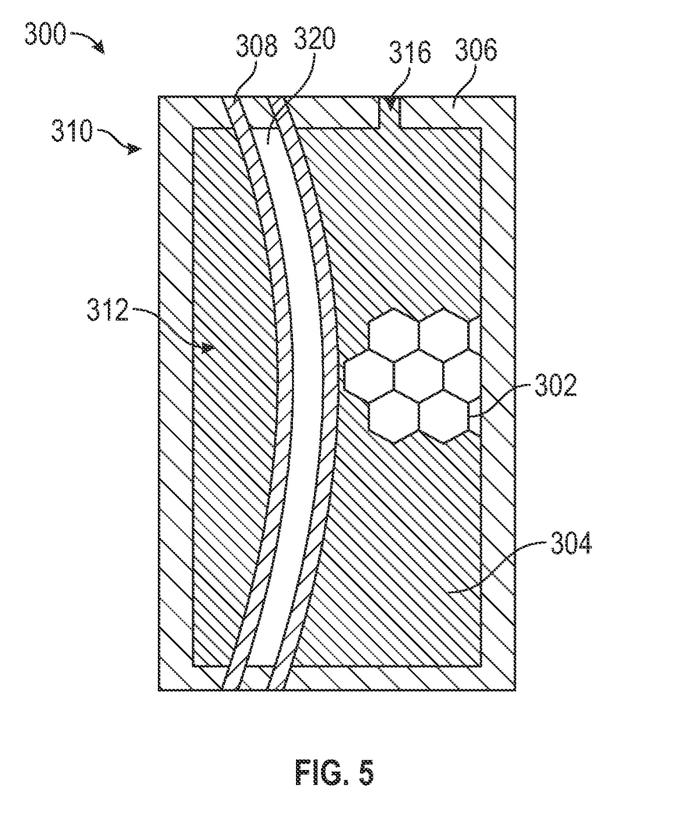
FIG. 5 is a schematic view of another example of a monolithic component with the segments of an outer shell filled with a bulk material and lattice structure embedded in the bulk material as complex design feature.

Referring now to FIG. 5, another example of a monolithic component 300 includes design complexities such as a lattice structure 302 embedded in a bulk material 304. The monolithic component 300 includes a first segment 306 and a second segment 308 of an outer shell 310. A cavity 312 defined between the first and second segments 306, 308, in which the lattice structure is defined, is filled with a bulk material 314 via the fill port 316. The embedded lattice structure 302 may be printed a from a distinct material or a material from which the first or second segments 306, 308 is printed to provide desired functional properties. The lattice structure 302 may define voids within the bulk material 304, provide flexibility or support to a fluid passageway 320 defined through the second segments 308, or may provide any other functional purpose. The lattice structures 302 may be diffusion bonded to the outer shell 310 and the bulk material 314 by a HIP process as described above.

Figure 6A:
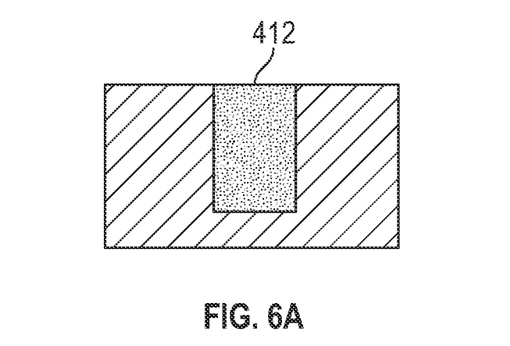
FIG. 6A is a schematic view of an example of another complex design feature (a blind hole) that can be embedded in the outer shell or bulk material of FIG. 5.
Figure 6B:
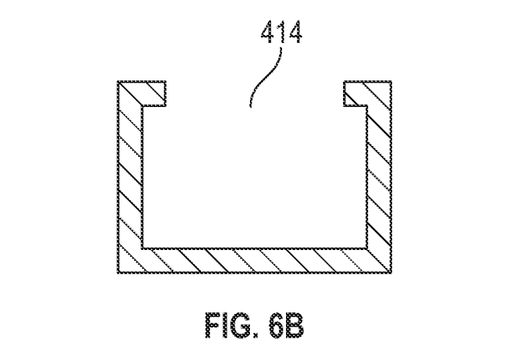
FIG. 6B is a schematic view of an example of another complex design feature (a channel) that can be embedded in the outer shell or bulk material of FIG. 5.
Figure 6C:
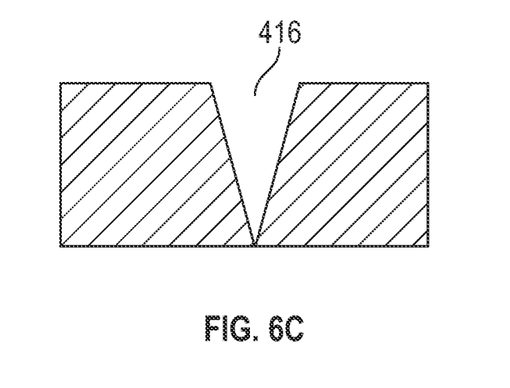
FIG. 6C is a schematic view of an example of another complex design feature (a groove) that can be embedded in the outer shell or bulk material of FIG. 6.

FIGS. 6A, 6B, and 6C are schematic views illustrating other design complexities that can be achieved by applying the manufacturing techniques described above. Blind hole 412 (FIG. 6A) may readily be printed with a flat bottom and may be formed in a distinct material selected for interfacing with a component to be received in the blind hole 412. A channel 414 (FIG. 6B), and/or groove 416 (FIG. 6C) may be formed in an outer shell, and or may be embedded into a bulk material similar to the lattice structure 302 (FIG. 5) to be manufactured as integral part of the monolithic component.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

According to one aspect of the disclosure a method of manufacturing a monolithic component includes (a) creating an outer shell of the monolithic component by an additive manufacturing process, (b) loading the outer shell with a bulk material, and (c) subjecting the outer shell and the bulk material to an elevated temperature and an elevated gas pressure to thereby bind the bulk material and outer shell to form the monolithic component.

In one or more embodiments, creating the outer shell may include printing a first segment defining an exterior surface of the monolithic component and a second segment defining an interior passage through the monolithic component. Loading the outer shell may include loading the bulk material into a cavity defined between the first and second segments.

In some embodiments, printing the first segment of the outer shell includes depositing a first material and printing the second segment of the outer shell includes depositing a second material. The second material may be different than the first material. In one or more embodiments, at least one of the first material and the second material includes at least one of the group consisting of a tungsten carbide, a ceramic, and a cobalt based alloy. Loading the outer shell may include loading a bulk material having a lower hardness relative to the at least one of the first material and the second material.

In one or more embodiments, at least one of the additive manufacturing process and loading the outer shell includes varying a composition of a construction material in at least one spatial direction to thereby functionally grade the monolithic component. In some embodiments, the method further includes loading the outer shell and the bulk material into a HIP furnace and elevating a temperature and gas pressure in the furnace sufficiently to create nucleation points in the outer shell and bulk material. Elevating the temperature and gas pressure may include selecting temperatures and gas pressures sufficient to eliminate material porosity in the outer shell and the bulk material. The method may further include printing a lattice structure and embedding the lattice structures within the bulk material.

According to another aspect of the disclosure, a monolithic component may be constructed any of the methods described above. The monolithic component may be employed in downhole operations, and may be functionally graded to provide specific properties, e.g., hardness, chemical resistance, etc., near a surface region of the monolithic component that contacts a geologic formation or drilling mud in the downhole operation. The remainder of the monolithic component may be constructed to provide adequate structural support properties to complete the downhole operations.

According to another aspect, the disclosure is directed to functionally grading a monolithic component. The method includes (a) depositing a first material by an additive manufacturing process to form an outer shell of the monolithic component, (b) loading the outer shell with a bulk material different than the first material, and (c) sealing and furnace hipping the outer shell and the bulk material in hot isostatic pressing process to thereby form a diffusion bond between the first material and the bulk material.

In one or more embodiments, depositing the first material may include melting a relatively hard metal with respect to the bulk material and depositing the relatively hard metal in a 3-D printing process. Depositing the relatively hard metal may include defining an exterior surface of the monolithic component and an interior passage through the monolithic component. Loading the outer shell may include loading the bulk material into a cavity defined between the exterior surface and the interior passage of the monolithic component.

In some embodiments, loading the outer shell includes filling the outer shell with a powder including at least one of a metal-based material, a polymer-based material, a ceramic-based material and a composite-based material. In some embodiments, the method further includes forming a lattice structure within the outer shell with the additive manufacturing process.

According to another aspect, the disclosure is directed to a functionally graded monolithic component. The monolithic component includes an outer shell defining an exterior surface of the monolithic component, the outer shell constructed by depositing a first material in an additive manufacturing process. A bulk material is disposed within the outer shell and bonded to the outer shell by a hot isostatic pressing process. The first material and the bulk material are dissimilar to provide distinct functional properties to the monolithic component.

In one or more embodiments, the first material exhibits a greater hardness than the bulk material. The bulk material may define a majority a volume of the monolithic component. In some embodiments, the outer shell includes a first segment defining the exterior surface of the monolithic component and a second segment defining an interior passageway extending through the monolithic component. In some embodiments, the second segment is constructed by a second material distinct from the first material. Both the first material and the second material may exhibit a greater hardness than the bulk material.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A method of manufacturing a monolithic component, the method comprising:
   creating an outer shell of the monolithic component by an additive manufacturing process;
   subsequently loading the outer shell with a bulk material; and
   subjecting the outer shell and the bulk material to an elevated temperature and an elevated gas pressure to thereby bind the bulk material and outer shell to form the monolithic component, wherein the monolithic component comprises an interior passage therethrough, wherein creating the outer shell comprises printing a first segment defining an exterior surface of the monolithic component and a second segment defining and adjacent to the interior passage through the monolithic component, and wherein loading the outer shell comprises loading the bulk material into a cavity defined between the first and second segments.

2. The method according to claim 1, wherein printing the first segment of the outer shell comprises depositing a first material and wherein printing the second segment of the outer shell comprises depositing a second material, wherein the second material is different than the first material.

3. The method according to claim 2, wherein at least one of the first material and the second material comprises at least one of the group consisting of a tungsten carbide, a ceramic, and a cobalt based alloy.

4. The method according to claim 3, wherein loading the outer shell comprises loading a bulk material having a lower hardness relative to the at least one of the first material and the second material.

5. The method according to claim 1, wherein at least one of the additive manufacturing process and loading the outer shell includes varying a composition of a construction material in at least one spatial direction.

6. The method according to claim 1, further comprising loading the outer shell and the bulk material into a HIP furnace and elevating a temperature and gas pressure in the furnace to create the monolithic component.

7. The method according to claim 6, wherein the elevating the temperature and gas pressure includes selecting temperatures and gas pressures sufficient to eliminate material porosity in the outer shell and the bulk material.

8. The method according to claim 1, further comprising printing a lattice structure and embedding the lattice structures within the bulk material.

9. The method of claim 2, wherein at least two of the first material, the second material, and the bulk material are distinct materials, wherein the first material comprises a corrosion resistant material, wherein the second material comprises an erosion resistant material, and wherein the bulk material comprises a structural support material selected from a metal-based material, a polymer-based, a ceramic-based, a composite-based material, or a combination thereof.

10. The method of claim 9, wherein the first material comprises stainless steel, 316 stainless steel alloyed with molybdenum, or a combination thereof.

11. The method of claim 10, wherein the second material comprises solid tungsten carbide, solid ceramic, or solid cobalt-based alloy.

12. The method of claim 1, wherein loading the outer shell with the bulk material comprises loading the bulk material into the outer shell in a molten state or powder form via one or more fill ports in the outer shell.

* * * * *